Feb. 21, 1950

R. SCHÄRLI ET AL 2,498,183

TRANSFORMER

Filed Sept. 17, 1947

Inventors.
Rudolf Schärli,
August Meyerhans.

By Pierce, Scheffler & Parker,
Attorneys.

Patented Feb. 21, 1950

2,498,183

UNITED STATES PATENT OFFICE 2,498,183

TRANSFORMER

Rudolf Schärli, Baden, and August Meyerhans, Nussbaumen, near Baden, Switzerland, assignors to Aktiengesellschaft Brown, Boveri & Cie., Baden, Switzerland Application September 17, 1947, Serial No. 774,610
In Germany November 8, 1938

Section 1, Public Law 690, August 8, 1946
Patent expires November 8, 1958

1 Claim. (Cl. 175—356)

For insulating the high voltage winding of a transformer from the low voltage winding and the frame, it is an advantage to surround the high voltage winding with a covering of solid insulating material in order to achieve a high insulating strength within a small space. With such an arrangement it is difficult, however, to provide a path for the cooling medium for carrying away the energy dissipated as heat in the winding which does not at the same time act as a discharge path. It is known to surround the high voltage winding with an insulating casing in one or more sections which at the points furthest away from the iron is provided with openings for the entrance and discharge of the cooling medium. In this case the winding is cooled by the heat being absorbed by the cooling medium in the radial slits, the heat then being transferred to the cooling medium in the longitudinal channels between the winding and the insulating casing. The cooling medium has to be kept in circulation by some known means. It is also known to block the electrical discharge path over the inlet and outlet openings for the cooling medium in the insulating casing, by means of solid pieces of insulation. Another way of solving this problem is to divide the high voltage winding into cylindrical coils arranged concentrically one above the other, the innermost coil adjoining the low voltage winding being insulated from the last one by an insulating cylinder of solid insulating material which at both ends is bent over the high voltage winding. The other coils are also separated from each other by solid insulation. The heat produced in the coils is carried away in vertical channels located between the coils, the cooling medium entering and leaving between the angular insulation pieces. This arrangement is, however, complicated and expensive and leaves the high voltage winding completely open on one of the longitudinal sides.

The present invention concerns a high voltage winding insulated on all sides for transformers, where the aforementioned disadvantages are avoided according to the invention by the winding being enclosed by two insulating cylinders which are provided with reinforced flanges which surround the end surfaces of the winding coils in such a manner that annular gaps for the inlet and outlet of the cooling medium are formed between the flanges facing each other.

Figure 1:
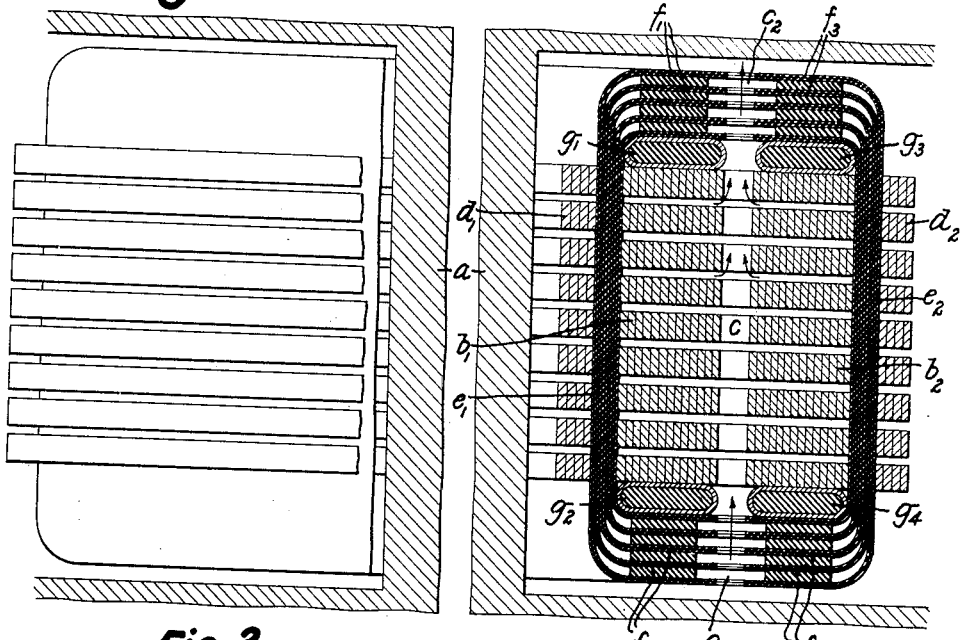
Figure 2:
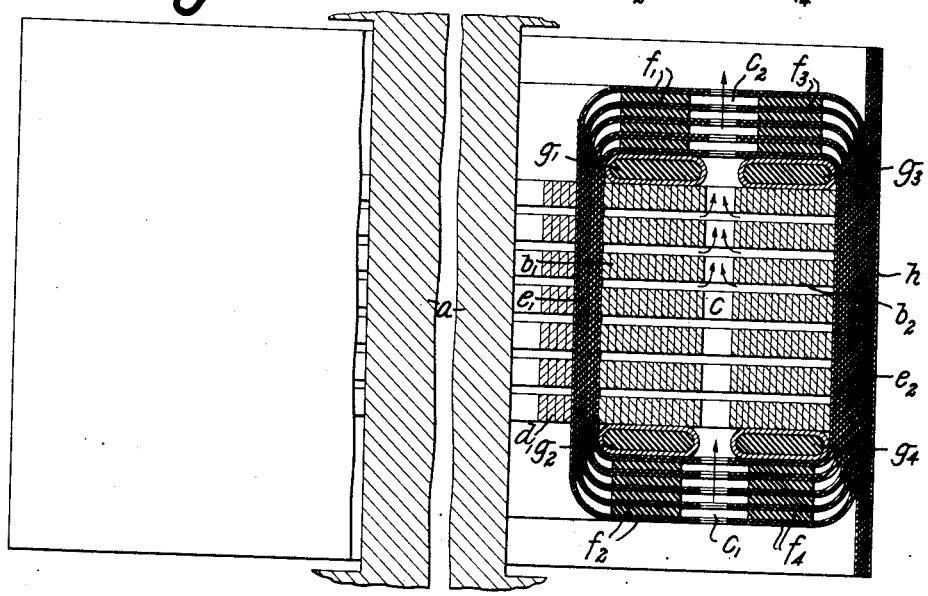

Constructional examples of the invention are shown schematically in Figs. 1 and 2 of the drawing.

In the figures, $a$ is the iron frame of the transformer. The high voltage winding of the transformer is divided into two cylindrical windings $b_1$, $b_2$ which are arranged concentrically at such a distance from each other that an annular cooling channel $c$ is formed which extends over the entire length of the winding. The low voltage cylindrical windings are indicated by $d_1$, $d_2$, these being arranged concentrically with the high voltage winding. The high voltage winding is surrounded by two insulating cylinders $e_1$, $e_2$ made of layers of high quality paper and provided with reinforced flanges $f_1$ to $f_4$ which enclose the end surfaces of the high voltage cylindrical windings $b_1$, $b_2$ in such a manner that annular gaps $c_1$, $c_2$ for the inlet and outlet of the cooling medium are formed between the flanges facing each other. Either a liquid such as oil, or also air or a gas can be used as the cooling medium. Reference letters $g_1$ to $g_4$ indicate protective rings at the ends of the cylindrical coils of the high voltage winding, these rings consisting of insulating material with a metallic covering or a metal. The reinforcement of the flanges on the insulating cylinders can be achieved in various ways, for instance by bending over the paper layers of the insulating cylinders $e_1$, $e_2$ either singly or several at a time so as to form an angle, and then inserting sector-shaped spacers therebetween.

By means of the arrangement according to the invention it is possible to build transformers in which the distance between the high voltage winding and the surrounding elements is reduced to a minimum, whilst at the same time the heat produced in the windings is carried away in a most efficient manner without any special expensive devices.

A modified form of the invention is shown in Fig. 2. In this case the outside paper layers of the insulating cylinder $e_2$ are not bent over to reinforce the flange, but are left standing and are provided with a metallic screening cover $h$, the axial length of which is greater than the height of the insulating cylinder $e_2$ with the reinforced flanges. The axial extension of the screen beyond the insulating cylinder increases the protective effect and reduces the risk of leakage discharges occurring. When using a protective screen which is longer than the insulation of the winding, it is an advantage if the projecting ends of the metal screen are covered with insulation on the side facing the winding.

If out of consideration for the construction of the transformer, it is necessary to provide free intermediate spaces outside of the insulating cylinders $e_1$, $e_2$ between the winding insulation and the other winding parts or the transformer iron, then a similar screen can be provided in the same way.

We claim:

In a transformer, a cylindrical primary winding including an annular internal passageway extending lengthwise therethrough for the circulation of a cooling medium, inner and outer insulating tubes in contact with the inner and outer surfaces of said winding, the opposite ends of said tubes terminating in mutually confronting flanges projecting over and extending for a substantial distance beyond the end surfaces of said winding and which flanges are thickened in the direction of said passageway so as to establish upper and lower annular gaps therebetween in alignment with said passageway to provide an inlet and outlet respectively for the cooling medium and a cylindrical secondary winding spaced radially from said primary winding by at least one of said tubes.

RUDOLF SCHÄRLI.
AUGUST MEYERHANS.

REFERENCES CITED

The following references are of record in the file of this patent:

UNITED STATES PATENTS

| Number | Name | Date |
|---|---|---|
| 1,249,800 | Mateer | Dec. 11, 1917 |
| 1,940,840 | Bellaschi | Dec. 26, 1933 |
| 2,116,404 | Montsinger | May 3, 1938 |
| 2,217,442 | Hendricks, Jr. | Oct. 8, 1940 |
| 2,288,201 | Meyerhans | June 30, 1942 |
| 2,348,239 | Beldi | May 9, 1944 |

FOREIGN PATENTS

| Number | Country | Date |
|---|---|---|
| 90,622 | Sweden | Feb. 13, 1935 |
| 416,541 | Great Britain | Sept. 17, 1934 |
| 564,817 | Germany | Nov. 10, 1932 |